US012393484B2

(12) United States Patent
Armangau et al.

(10) Patent No.: US 12,393,484 B2
(45) Date of Patent: Aug. 19, 2025

(54) HASHTAG CODES FOR REDUCED REPAIR BANDWIDTH

(71) Applicant: Dell Products, L.P., Round Rock, TX (US)

(72) Inventors: Philippe Armangau, Kalispell, MT (US); Jamin Jianbin Kang, Beijing (CN); Baote Zhuo, Beijing (CN)

(73) Assignee: Dell Products L.P., Round Rock, TX (US)

( * ) Notice: Subject to any disclaimer, the term of this patent is extended or adjusted under 35 U.S.C. 154(b) by 28 days.

(21) Appl. No.: 18/417,961

(22) Filed: Jan. 19, 2024

(65) Prior Publication Data

US 2025/0238313 A1    Jul. 24, 2025

(51) Int. Cl.
| G06F 11/10 | (2006.01) |
| G06F 11/14 | (2006.01) |
| G06F 11/34 | (2006.01) |

(52) U.S. Cl.
CPC ...... *G06F 11/1004* (2013.01); *G06F 11/1435* (2013.01); *G06F 11/3409* (2013.01)

(58) Field of Classification Search
CPC ............. G06F 11/1004; G06F 11/1435; G06F 11/3409
See application file for complete search history.

(56) References Cited

U.S. PATENT DOCUMENTS

2014/0201596 A1* 7/2014 Baum ............... H03M 13/1128
                                                    714/764
2024/0394146 A1* 11/2024 Dhuse .................... H04L 67/06

OTHER PUBLICATIONS

Kralevska, et al. "HashTag Erasure Codes: From Theory to Practice" arXiv:1609.02450v4 [cs.IT], [https://arxiv.org/pdf/1609.02450], Jul. 3, 2017, 14 pages.

* cited by examiner

*Primary Examiner* — Thien Nguyen
(74) *Attorney, Agent, or Firm* — Amin, Turocy & Watson, LLP

(57) ABSTRACT

A system can determine to generate error correction codes for a storage system that comprises computing nodes. The system can logically divide the computing nodes into disjunctive subsets. The system can, for each disjunctive subset, create a partition, and identify a group of elements that comprises sub-strips of the disjunctive subset. The system can add a first element from each disjunctive subset of the disjunctive subsets to the partition, and removing the first element from the group of elements. The system can, for each disjunctive subset, add a second element from the group of elements along with elements stored in parity notes of a sub-strip where the second element is located. The system can, in response to determining that a number of elements of the disjunctive subset is at least as large as a number of the computing nodes, create the error correction codes based on the elements.

20 Claims, 14 Drawing Sheets

500 ⬎

> HASHTAG CODES FOR REDUCED REPAIR BANDWIDTH COMPONENT 510

| Partitions 502 | Condition 1 504 | Condition 2 506 | ValidPartition 508 |
|---|---|---|---|
| D1 = {J1: {{1,2,3},{4,5,6},{7,8,9}}, J2:{{1,4,7},{2,5,8},{3,6,9}}} | Y, run = 3, step = 0, for J1; run = 1, step = 2, for J2 | Y | Y |
| D2 = {J1: {{1,2,3},{4,5,6},{7,8,9}}, J2:{{1,5,9},{2,6,7},{3,4,8}}} | N | Y | N |
| D3 = {J1: {{1,2,3},{4,5,6},{7,8,9}}, J2:{{1,3,5},{2,4,6},{7,8,9}}} | N | N | N |

FIG. 5

| | | | HASHTAG CODES FOR REDUCED REPAIR BANDWIDTH COMPONENT 610 |

600 ↘

| | | run = $2^3$ | step = 0 | $J_1 = \{\{1,2,3,4,5,6,7,8\},$ $\{9,10,11,12,13,14,15,16\}\}$ |
|---|---|---|---|---|
| 602 ↘ | v=1 | | | |
| 604 ↘ | v=2 | run = $2^2$ | step = 4 | $J_2 = \{\{1,6,11,16,5,11,16,5\},\{\}\}$ |
| 606 ↘ | v=3 | run = $2^1$ | step = 6 | $J_3 = \{\{1,2,4,6,8,11,13,15\},$ $\{3,5,7,9,10,12,13,14,15\}\}$ |
| 606 ↘ | v=4 | run = $2^0$ | step = 7 | $J_4 = \{\{1,9,1,9\}, \{\}\}$ |

FIG. 6

HASHTAG CODES FOR REDUCED REPAIR BANDWIDTH COMPONENT 706

| | d1 | d2 | d3 | d4 | d5 | d6 | d7 | d8 | p1 | p2 |
|---|---|---|---|---|---|---|---|---|---|---|
| s1 | d1,1 | d1,2 | d1,3 | d1,4 | d1,5 | d1,6 | d1,7 | d1,8 | f1(1) | f2(1)+d9,1+d5,3+d3,5+d2,7 |
| s2 | d2,1 | d2,2 | d2,3 | d2,4 | d2,5 | d2,6 | d2,7 | d2,8 | f1(2) | f2(2)+d10,1+d6,3+d4,5+d1,8 |
| s3 | d3,1 | d3,2 | d3,3 | d3,4 | d3,5 | d3,6 | d3,7 | d3,8 | f1(3) | f2(3)+d11,1+d7,3+d1,6+d4,7 |
| s4 | d4,1 | d4,2 | d4,3 | d4,4 | d4,5 | d4,6 | d4,7 | d4,8 | f1(4) | f2(4)+d12,1+d8,3+d2,6+d3,8 |
| s5 | d5,1 | d5,2 | d5,3 | d5,4 | d5,5 | d5,6 | d5,7 | d5,8 | f1(5) | f2(5)+d13,1+d1,4+d7,5+d6,7 |
| s6 | d6,1 | d6,2 | d6,3 | d6,4 | d6,5 | d6,6 | d6,7 | d6,8 | f1(6) | f2(6)+d14,1+d2,4+d8,5+d5,8 |
| s7 | d7,1 | d7,2 | d7,3 | d7,4 | d7,5 | d7,6 | d7,7 | d7,8 | f1(7) | f2(7)+d15,1+d3,4+d5,6+d8,7 |
| s8 | d8,1 | d8,2 | d8,3 | d8,4 | d8,5 | d8,6 | d8,7 | d8,8 | f1(8) | f2(8)+d16,1+d4,4+d6,6+d7,8 |
| s9 | d9,1 | d9,2 | d9,3 | d9,4 | d9,5 | d9,6 | d9,7 | d9,8 | f1(9) | f2(9)+d1,2+d13,3+d11,5+d10,7 |
| s10 | d10,1 | d10,2 | d10,3 | d10,4 | d10,5 | d10,6 | d10,7 | d10,8 | f1(10) | f2(10)+d2,2+d14,3+d12,5+d9,8 |
| s11 | d11,1 | d11,2 | d11,3 | d11,4 | d11,5 | d11,6 | d11,7 | d11,8 | f1(11) | f2(11)+d3,2+d15,3+d9,6+d12,7 |
| s12 | d12,1 | d12,2 | d12,3 | d12,4 | d12,5 | d12,6 | d12,7 | d12,8 | f1(12) | f2(12)+d4,2+d16,3+d10,6+d11,8 |
| s13 | d13,1 | d13,2 | d13,3 | d13,4 | d13,5 | d13,6 | d13,7 | d13,8 | f1(13) | f2(13)+d5,2+d9,4+d15,5+d14,7 |
| s14 | d14,1 | d14,2 | d14,3 | d14,4 | d14,5 | d14,6 | d14,7 | d14,8 | f1(14) | f2(14)+d6,2+d10,4+d16,5+d13,8 |
| s15 | d15,1 | d15,2 | d15,3 | d15,4 | d15,5 | d15,6 | d15,7 | d15,8 | f1(15) | f2(15)+d7,2+d11,4+d13,6+d16,7 |
| s16 | d16,1 | d16,2 | d16,3 | d16,4 | d16,5 | d16,6 | d16,7 | d16,8 | f1(16) | f2(16)+d8,2+d12,4+d14,6+d15,8 |

| sub-strip level | 8 | 16 | 32 | 64 | 128 | 256 | 512 | 1024 |
|---|---|---|---|---|---|---|---|---|
| 76+2 | 63.20% | 61.70% | 60.90% | 59.80% | 59.20% | 59.00% | 58.80% | 58.60% |
| (76+2)+(76+2) | 31.60% | 30.85% | 30.45% | 29.90% | 29.60% | 29.50% | 29.40% | 29.30% |
| 152+4 | 40.60% | 39.50% | 39.00% | 38.80% | 38.60% | 38.30% | 38.10% | 37.80% |
| 64+2 | 63.00% | 62.10% | 61.90% | 61.50% | 60.40% | 59.50% | 58.60% | 57.70% |
| (64+2)+(64+2) | 31.50% | 31.05% | 30.95% | 30.75% | 30.20% | 29.75% | 29.30% | 28.85% |
| 128+4 | 40.50% | 39.40% | 39.00% | 38.70% | 38.50% | 38.10% | 37.80% | 37.50% |

FIG. 10

HASHTAG CODES FOR REDUCED REPAIR BANDWIDTH

BACKGROUND

Computer storage systems can comprise data redundancies or backups to mitigate against a risk of data loss.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine to generate error correction codes for a storage system that comprises computing nodes. The system can logically divide the computing nodes into disjunctive subsets. The system can, for each disjunctive subset of the disjunctive subsets, create a partition, with an initial empty state, and identify a group of elements that comprises sub-strips of the disjunctive subset. The system can add a first element from each disjunctive subset of the disjunctive subsets to the partition, and removing the first element from the group of elements. The system can, for each disjunctive subset, add a second element from the group of elements to the disjunctive subset along with elements stored in parity notes of a sub-strip where the second element is located. The system can, in response to determining that a number of elements of the disjunctive subset is at least as large as a number of the computing nodes, create the error correction codes based on the elements. The system can store the error correction codes on parity nodes of the computing nodes.

An example method can comprise logically dividing, by a system comprising at least one processor, computing nodes of a storage system into disjunctive subsets. The operations can further comprise, for each disjunctive subset of the disjunctive subsets, creating, by the system, a partition that is initially empty, and identifying, by the system, a group of elements that comprises sub-strips of the disjunctive subset. The operations can further comprise adding, by the system, a first element from each disjunctive subset of the disjunctive subsets to the partition, and removing the first element from the group of elements. The operations can further comprise, for each disjunctive subset, adding, by the system, a second element from the group of elements to the disjunctive subset along with elements stored in parity notes of a sub-strip where the second element is located. The operations can further comprise, in response to determining that a number of elements of the disjunctive subset is at least as large as a number of the computing nodes, creating, by the system, error correction codes based on the elements. The operations can further comprise storing, by the system, the error correction codes on the computing nodes.

An example non-transitory computer-readable medium can comprise instructions that, in response to execution, cause a system comprising a processor to perform operations. These operations can comprise, for each disjunctive subset of disjunctive subsets of computer nodes of a storage system, identifying a group of elements that comprises sub-strips of the disjunctive subsets. These operations can further comprise adding a first element from each disjunctive subset to a partition, and removing the first element from the group of elements. These operations can further comprise, for each disjunctive subset of the disjunctive subsets, adding a second element from the group of elements to the disjunctive subset along with elements stored in parity notes of a sub-strip where the second element is located. These operations can further comprise, in response to determining that a number of elements of the disjunctive subset is at least as large as a number of the computer nodes, creating error correction codes based on the elements. These operations can further comprise storing the error correction codes on the computer nodes.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 5 illustrates an example table that compares three partitions for a (9, 6) code for $\alpha=9$, and that can facilitate HashTag codes for reduced repair bandwidth, in accordance with an embodiment of this disclosure;

FIG. 6 illustrates an example table that shows a result of a (10, 8) code with $\alpha=16$ with resulting invalid partitions generated by run and step, and that can facilitate HashTag codes for reduced repair bandwidth, in accordance with an embodiment of this disclosure;

FIG. 7 illustrates an example table that an optimal (10, 8) MSR code with $\alpha=16$, and that can facilitate HashTag codes for reduced repair bandwidth, in accordance with an embodiment of this disclosure;

FIG. 10 illustrates an example table showing a percentage of surviving data strips to read after optimizing HashTag code, and that can facilitate HashTag codes for reduced repair bandwidth, in accordance with an embodiment of this disclosure;

DETAILED DESCRIPTION

Overview

The present techniques can be implemented to facilitate an enhanced HashTag to optimize (or otherwise improve) repair bandwidth. In some examples of a distributed storage system, due to a large number of nodes, stripes of erasure codes can be wider, compared with non-distributed storage systems. Therefore it can be that, when repairing, more nodes are accessed, which can lead to a poor performance of the repair.

According to the present techniques, an enhanced HashTag Code can be implemented, and a code can be obtained that can be implemented in practical products with near-optimal repair bandwidth.

In some examples, benefits of implementing an enhanced HashTag Code according to the present techniques can include:
1. Optimized condition 1 in HashTag Code, to make it achievable.
2. Enhanced condition 2 in HashTag Code with a NB Matrix, to obtain a better repair bandwidth.
3. At the expense of fault tolerance, combining LRC and enhanced HashTag Code technology, it can be that a system can read from only 28.85% of surviving data strips to repair a whole stripe.
4. Without sacrificing fault tolerance, a system can read from only 37.5% of surviving data strips to repair a whole stripe.

Example Architectures and Workflows

Figure 1:
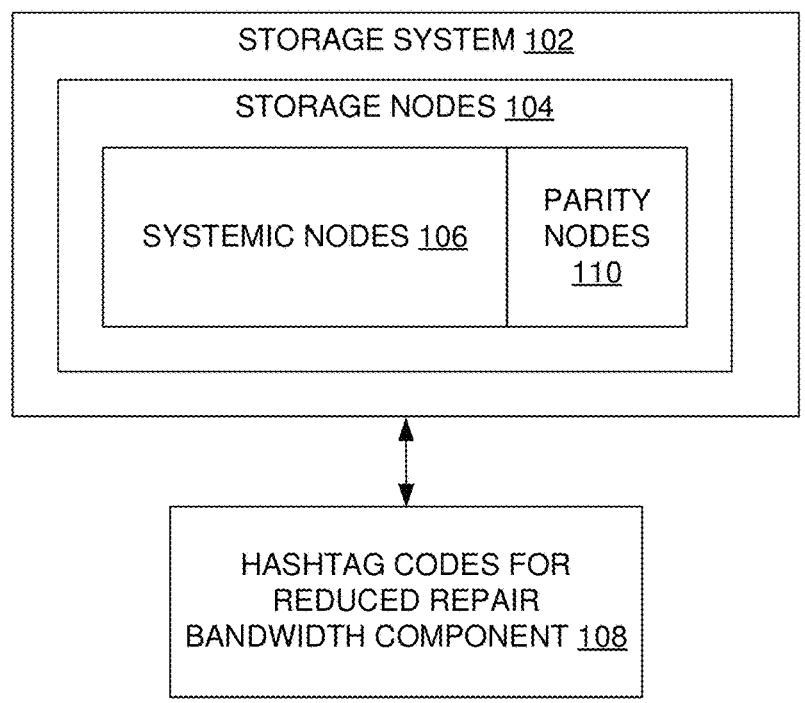
FIG. 1 illustrates an example system architecture that can facilitate HashTag codes for reduced repair bandwidth, in accordance with an embodiment of this disclosure.

FIG. 1 illustrates an example system architecture 100 that can facilitate HashTag codes for reduced repair bandwidth, in accordance with an embodiment of this disclosure.

System architecture 100 comprises storage system 102, storage nodes 104, and HashTag codes for reduced repair bandwidth component 108. In turn, storage nodes 104 comprises systemic nodes 106 and parity nodes 110.

System architecture 100 presents one logical example of implementing the present techniques, and it can be appreciated that there can be other examples, such as one where storage system 102 comprises HashTag codes for reduced repair bandwidth component 108.

Figure 14:
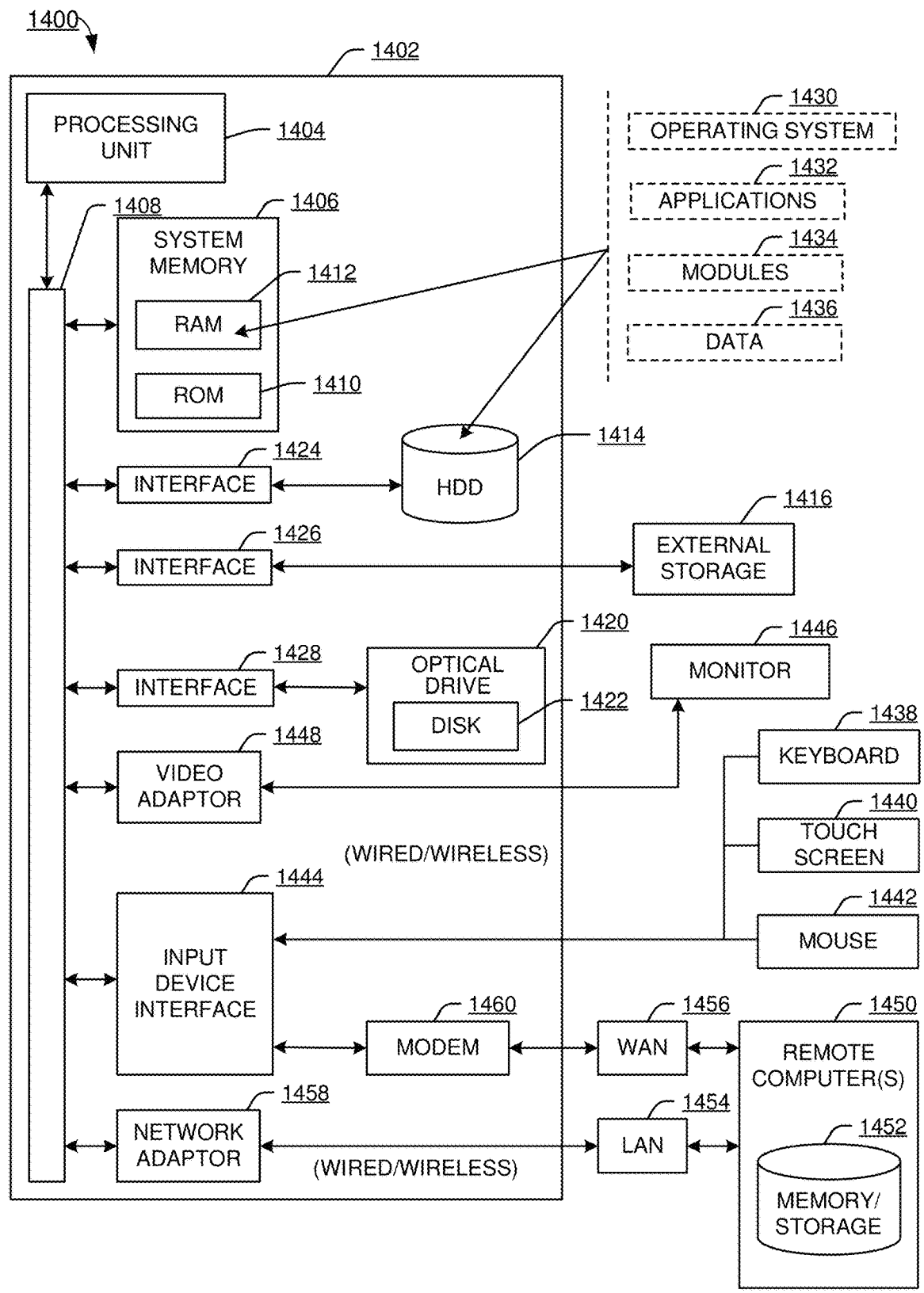
FIG. 14 illustrates an example block diagram of a computer operable to execute an embodiment of this disclosure.

Each of storage system 102, storage nodes 104, and HashTag codes for reduced repair bandwidth component 108 can be implemented with part(s) of computing environment 1400 of FIG. 14.

As part of storing data, HashTag codes for reduced repair bandwidth component 108 can determine HashTag codes for data stored in systemic nodes 106, and store the HashTag codes in parity nodes 110.

Figure 11:
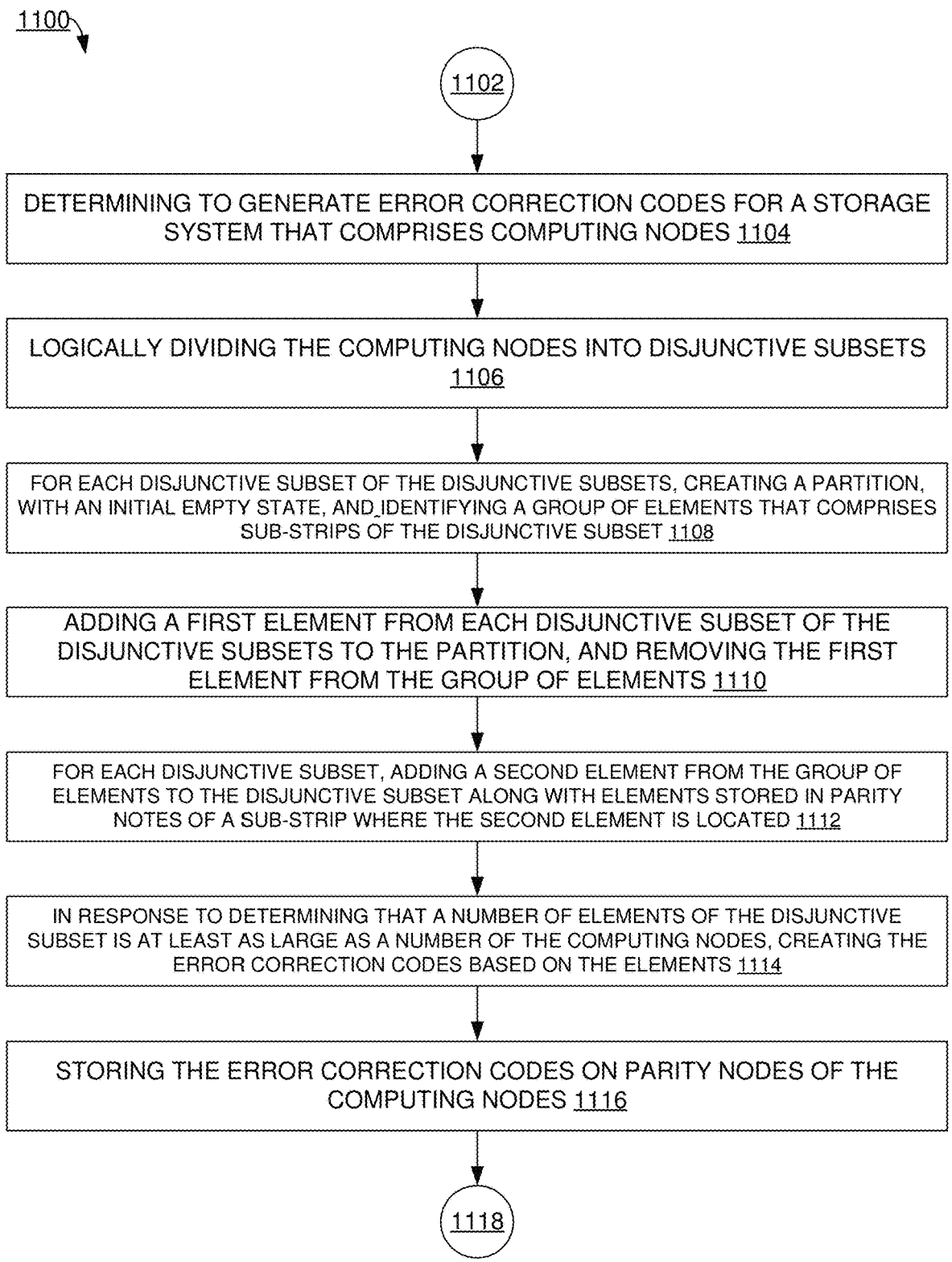
FIG. 11 illustrates an example process flow that can facilitate HashTag codes for reduced repair bandwidth, in accordance with an embodiment of this disclosure.
Figure 12:
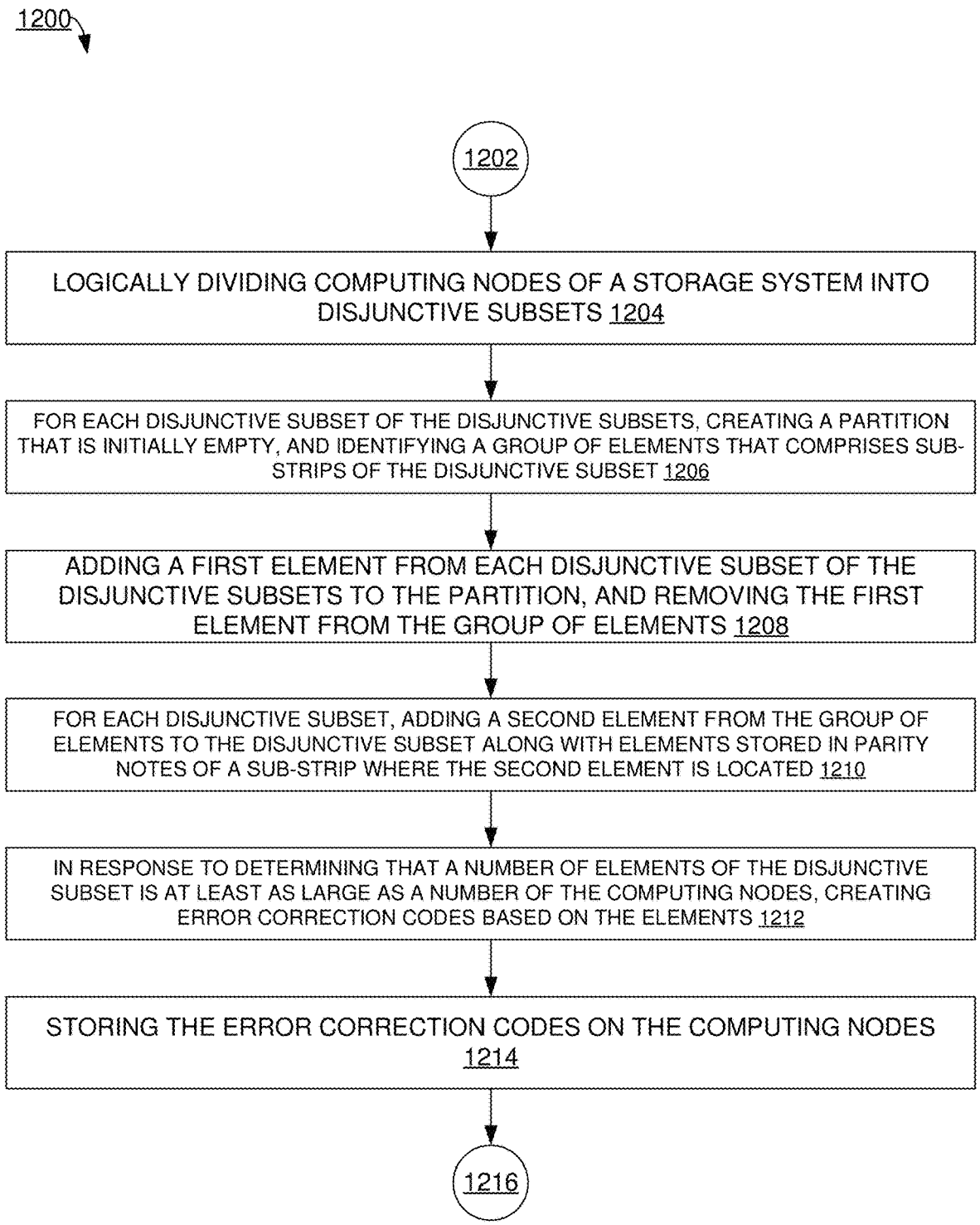
FIG. 12 illustrates another example process flow that can facilitate HashTag codes for reduced repair bandwidth, in accordance with an embodiment of this disclosure.
Figure 13:
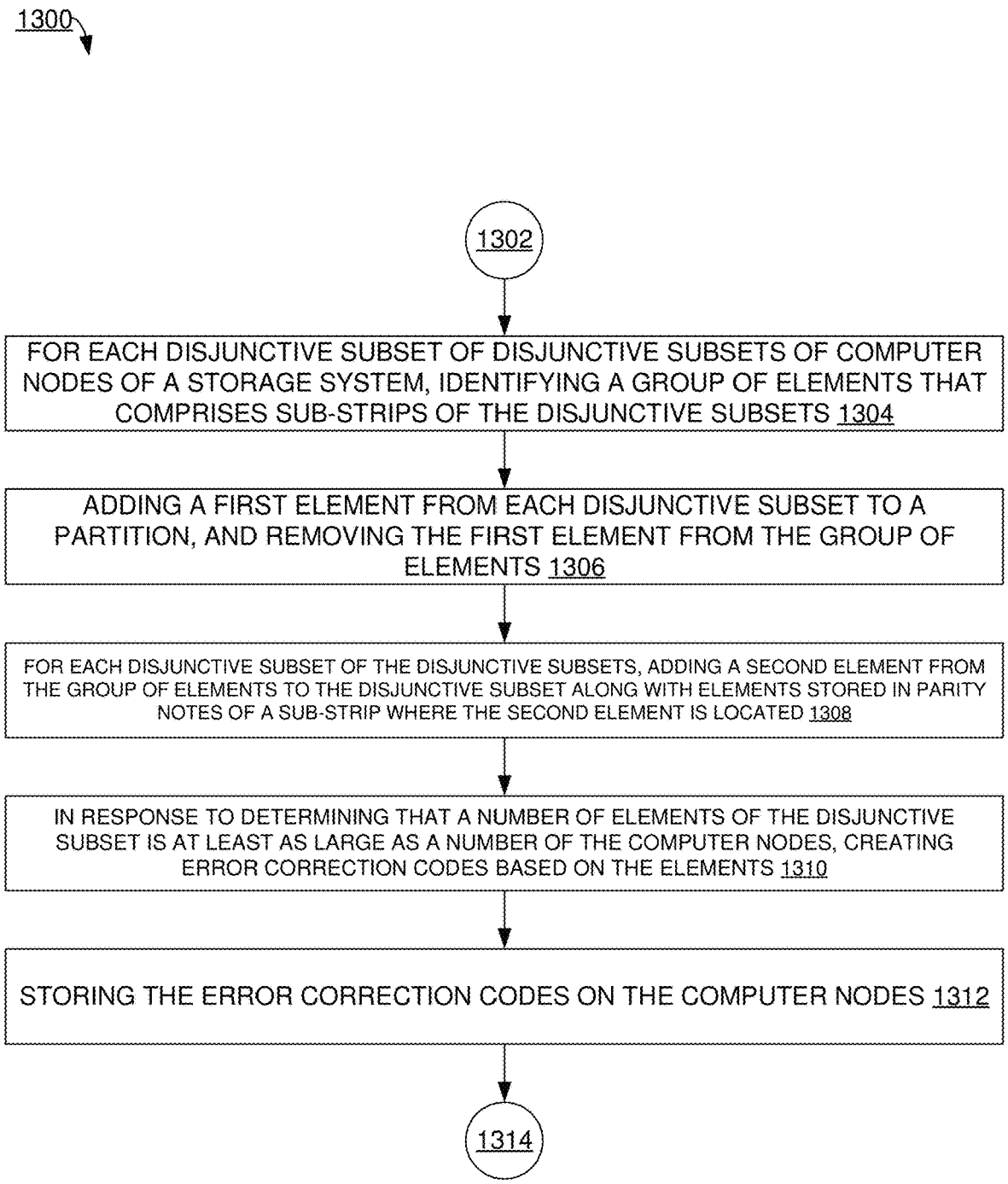
FIG. 13 illustrates another example process flow that can facilitate HashTag codes for reduced repair bandwidth, in accordance with an embodiment of this disclosure.

In some examples, HashTag codes for reduced repair bandwidth component 108 can implement part(s) of the process flows of FIGS. 11-13 to implement HashTag codes for reduced repair bandwidth.

It can be appreciated that system architecture 100 is one example system architecture for HashTag codes for reduced repair bandwidth, and that there can be other system architectures that facilitate HashTag codes for reduced repair bandwidth.

Figure 2:
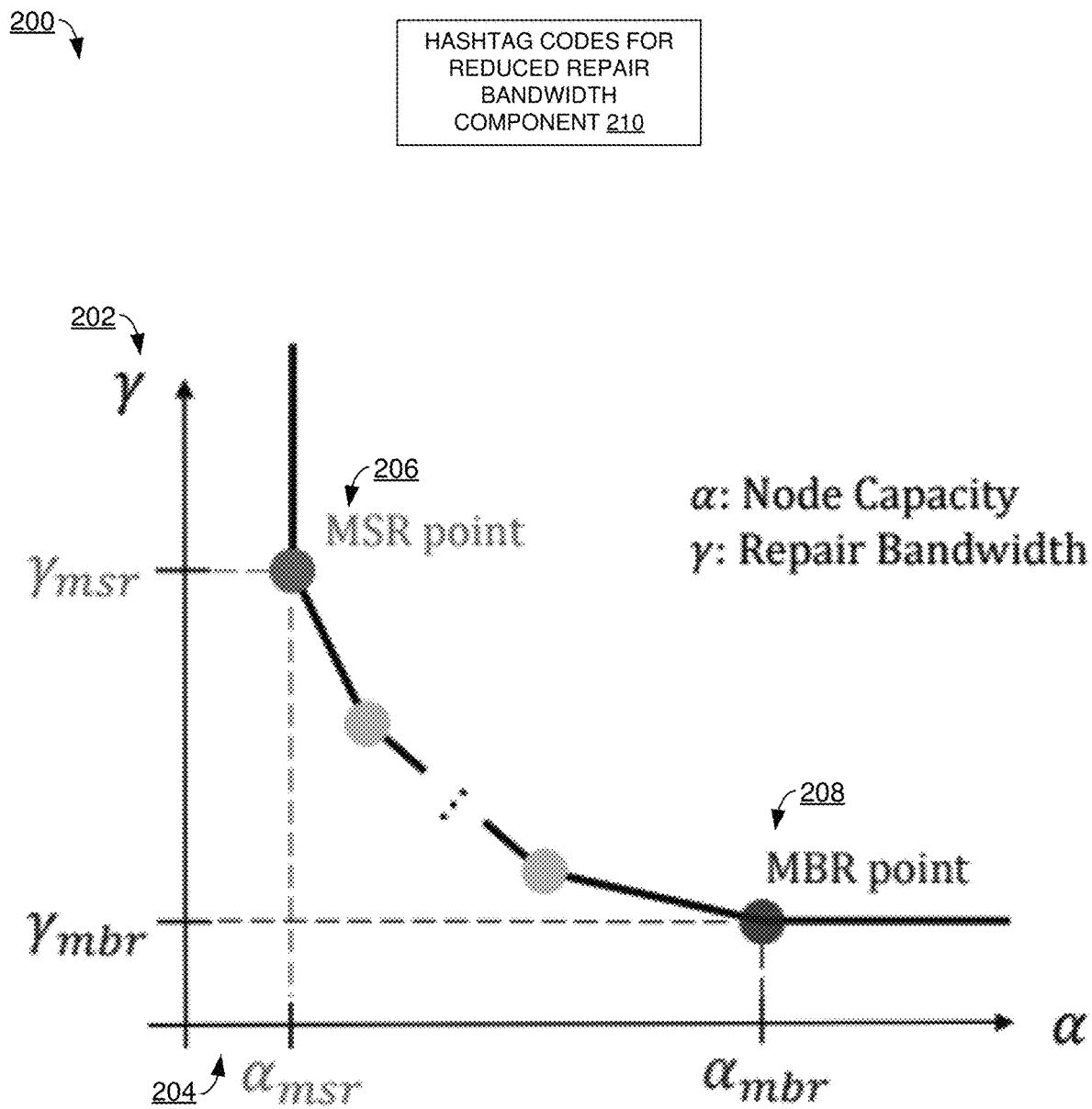
FIG. 2 illustrates an example graph of minimum storage regenerating (MSR) codes versus minimum bandwidth regenerating (MBR) codes, and that can facilitate HashTag codes for reduced repair bandwidth, in accordance with an embodiment of this disclosure.

FIG. 2 illustrates an example graph 200 of minimum storage regenerating (MSR) codes versus minimum bandwidth regenerating (MBR) codes, and that can facilitate HashTag codes for reduced repair bandwidth, in accordance with an embodiment of this disclosure. In some examples, part(s) of graph 200 can be implemented by part(s) of system architecture 100 of FIG. 1 to facilitate HashTag codes for reduced repair bandwidth.

Graph 200 comprises node capacity (a) 202, repair bandwidth (y) 204, MSR point 206, MBR point 208, and HashTag codes for reduced repair bandwidth component 210 (which can be similar to HashTag codes for reduced repair bandwidth component 108 of FIG. 1).

It can be that erasure coding is an attractive technique for data protection because it offers the same level of reliability, with significantly less storage overhead, compared to replication. Apart from reliability and storage overhead, repair bandwidth can also be a particularly important feature in a distributed storage system. Repair bandwidth can generally comprise an amount of data transferred during a repair process. Regeneration codes (RGC) can be implemented to significantly reduce the repair bandwidth.

As shown in FIG. 2, two notable types of RGC can be minimum storage regenerating codes (MSR) (at MSR point 206), and minimum bandwidth regenerating codes (MBR) (at MBR point 208). MSR codes can have the minimum storage overhead, and they can belong to a class of MDS codes. MBR codes can have the minimum possible repair bandwidth, but not MDS.

The storage overhead of an MBR code can be shown lower bounded by 2, whereas MSR codes can have storage overhead arbitrarily close to 1. So MSR can then be a point of interest.

Regarding repair bandwidth, a lower bound on the repair bandwidth for a (n, k, n−1) MSR code can be:

$$M/k * n-1/n-k$$

Here, the code has a total of n nodes with k nodes of information and r=n−k nodes of redundancy/parity, where M is the total amount of information. n−1 nodes can be contacted during a repair.

For example, with a (132, 128, 131) MSR code, n=132, k=128, r=4, its lower bound of repair bandwidth can be 25% of the total amount of information.

Regarding a sub-strip level, a lower bound of sub-strip level a of optimal repair bandwidth for MSR codes can be:

$$\alpha >= r^{\frac{k-1}{r}}$$

Here the code can have a total of n nodes with k nodes of information and r=n−k nodes of redundancy/parity.

For example, a (132, 128, 131) MSR code, n=132, k=128, r=4, if and only if $$\alpha >= 4^{\frac{127}{4}}$$

the code can achieve the lower bound of repair bandwidth. In actual storage systems, it can be that this theoretical lower bound is not achievable.

Figure 3:
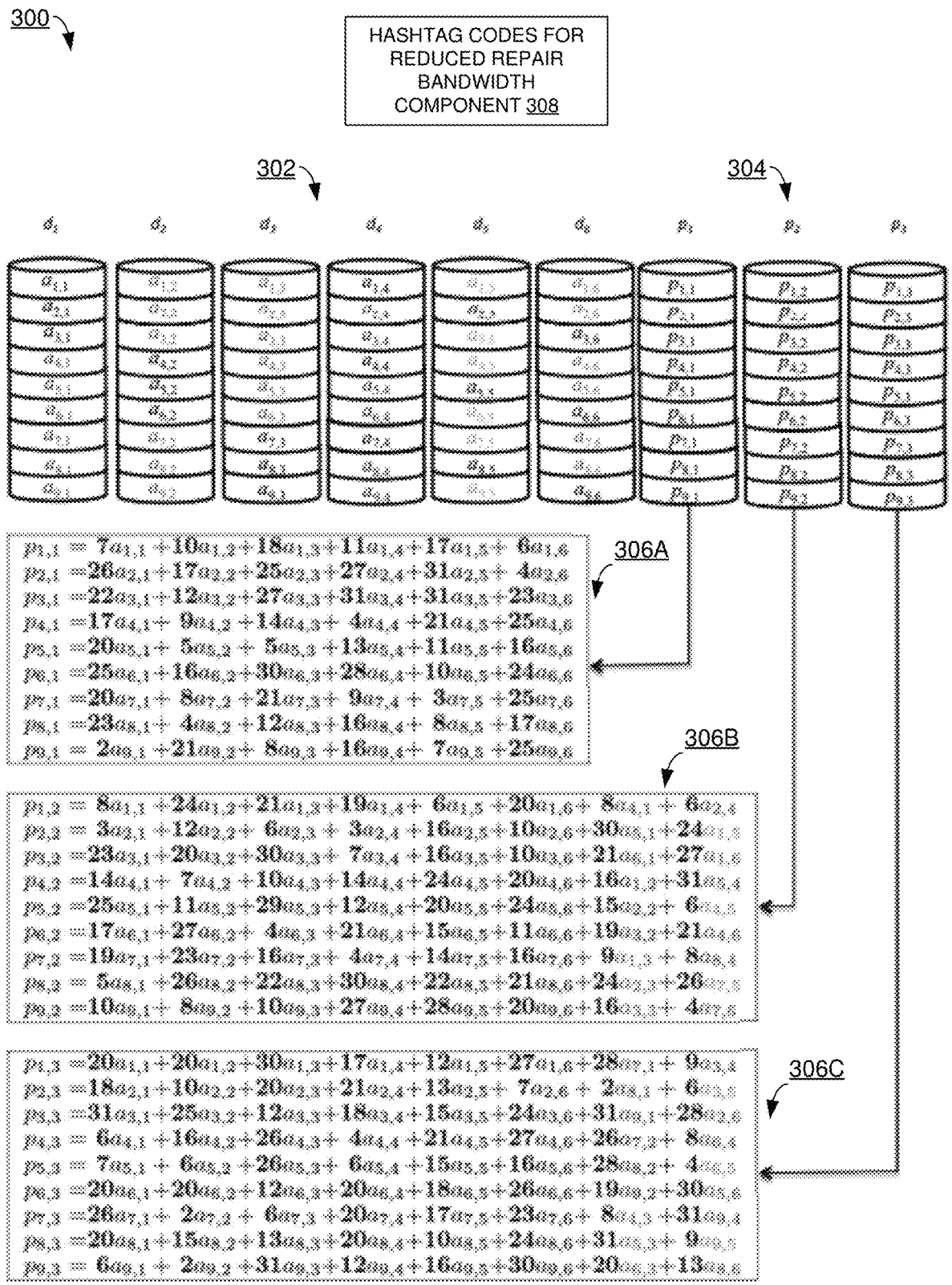
FIG. 3 illustrates an example (9, 6) HashTag code for $\alpha=9$, and that can facilitate HashTag codes for reduced repair bandwidth, in accordance with an embodiment of this disclosure.

FIG. 3 illustrates an example 300 (9, 6) HashTag code for $\alpha=9$, and that can facilitate HashTag codes for reduced repair bandwidth, in accordance with an embodiment of this disclosure. In some examples, part(s) of example 300 can be implemented by part(s) of system architecture 100 of FIG. 1 to facilitate HashTag codes for reduced repair bandwidth.

Example 300 comprises systemic nodes 302, parity nodes 304, HashTag codes 306A, HashTag codes 306B, HashTag codes 306C, and HashTag codes for reduced repair bandwidth component 308 (which can be similar to HashTag codes for reduced repair bandwidth component 108 of FIG. 1).

A HashTag Code can comprise a construction of (n, k, n−1) access-optimal regenerating codes for an arbitrary sub-strip level for exact repair of any systemic node.

In the (9, 6) HashTag code of FIG. 3, for 9 elements on each node, select 3 elements and keep them unchanged. Then the left 6 elements are scheduled as additional elements in sub-strips of p2 and p3—the right three elements.

In this way, under ideal conditions, when a node fails, it can be that only the sub stripe in the right three elements needs to be read to recover the entire disk's data. For example, if disk d1 fails, it can be that the whole disk can be repaired from reading the first three strips.

An aspect of implementing a HashTag code can involve how to select these right three elements on each disk to minimize repair bandwidth.

Figure 4:
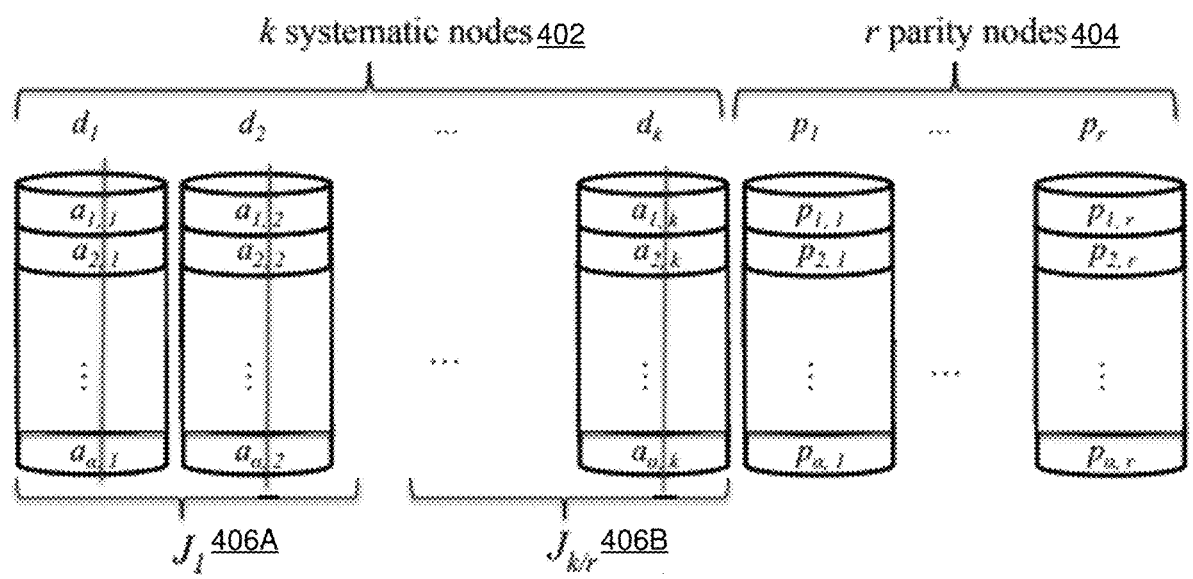
FIG. 4 illustrates example subsets of systemic nodes in HashTag code, and that can facilitate HashTag codes for reduced repair bandwidth, in accordance with an embodiment of this disclosure.

FIG. 4 illustrates example 400 subsets of systemic nodes in HashTag code, and that can facilitate HashTag codes for reduced repair bandwidth, in accordance with an embodiment of this disclosure. In some examples, part(s) of example 400 can be implemented by part(s) of system architecture 100 of FIG. 1 to facilitate HashTag codes for reduced repair bandwidth.

Example 400 comprises systemic nodes 402, parity nodes 404, disjunctive subset $J_1$ 406A, disjunctive subset $J_{k/r}$ 406B, and HashTag codes for reduced repair bandwidth component 408 (which can be similar to HashTag codes for reduced repair bandwidth component 108 of FIG. 1).

A valid partition can be implemented as follows.

As shown in the example of FIG. 4, the set $N=\{d_1, \ldots, d_k\}$ of k systemic nodes is partitioned in k/r disjunctive subsets $J_1, J_2, \ldots, J_{k/r}$ where $|J_v|=r$. A HashTag Code can relate to how to generate the valid partition for these node subsets.

For the first f ($f=\log_r \alpha$) node subsets, partitions that satisfy both condition 1 and condition 2 (described below) can be selected. For the left node subsets, partitions that satisfy condition 2 can be selected Condition 1: At least one subset $D_{p,dj}$ has portion=$\alpha/r$ elements with runs of run consecutive elements separated with a distance between the indexes equal to step.

Condition 2: A necessary condition for the valid partition to achieve the lowest possible repair bandwidth can be $D_{dj1}=D_{dj2}$ for all $d_{j1}$ and $d_{j2}$ in $J_v$ and $D_{p,dj}!=D_{p,dj2}$ for all $d_{j1}$ and $d_{j2}$ systemic nodes of the system.

For each $d_j$, determining run and step can be performed with:

$v=\lfloor j/r \rfloor$, $run=\lceil \alpha/r^v \rceil$, $step=\lceil \alpha/r \rceil - run$ So, when run decreases to 0, it can be that the HashTag Code select partitions only satisfy condition 2. If a sub-strip level is enough ($\alpha \geq r^{k/r}$), partitions can be found for all subsets that satisfy both condition 1 and condition 2, which can reach the lower bound of repair bandwidth.

FIG. 5 illustrates an example table 500 that compares three partitions for a (9, 6) code for $\alpha=9$, and that can facilitate HashTag codes for reduced repair bandwidth, in accordance with an embodiment of this disclosure. In some examples, part(s) of table 500 can be implemented by part(s) of system architecture 100 of FIG. 1 to facilitate HashTag codes for reduced repair bandwidth.

Table 500 comprises partitions 502, condition 1 504, condition 2 506, ValidPartition 508, and HashTag codes for reduced repair bandwidth component 510 (which can be similar to HashTag codes for reduced repair bandwidth component 108 of FIG. 1).

An Example of a valid partition can be as follows. In FIG. 5, a comparison is made of three partitions for a (9, 6) code for $\alpha=9$ where the partitions for $J_1$ and $J_2$ are given.

As shown in FIG. 5, there are three partitions for $J_1$ and $J_2$:

The partition $D_1$ is a valid partition since both Condition 1 and Condition 2 are satisfied.

The partition $D_2$ complies only with Condition 2 since none of the subsets in $\{\{1, 2, 3\}, \{4, 5, 6\}, \{7, 8, 9\}\}$ for the nodes in $J_1$ is equal to the subsets $\{\{1, 5, 9\}, \{2, 6, 7\}, \{3, 4, 8\}\}$ for the nodes in $J_2$, but it is not obtained by using regular run and step values.

Finally, the partition $D_3$ does not comply neither to Condition 1 nor Condition 2 since there are no regular run and step, and the same subset $\{7, 8, 9\}$ is present for the nodes from both $J_1$ and $J_2$, i.e. in $\{\{1, 2, 3\}, \{4, 5, 6\}, \{7, 8, 9\}\}$ and in $\{\{1, 3, 5\}, \{2, 4, 6\}, \{7, 8, 9\}\}$.

A neighborhood matrix can be designed to make Uber distribution as even as possible. A neighborhood matrix can comprise a N*N square matrix, where N is the number of disks in a RRS (redundant array of inexpensive disks (RAID) resiliency sets). Each number in the matrix can be denoted as NW(i, j), which indicates many times disk i has ever neighbored with disk j. While allocating an Uber, some disk slices can be selected from different disks. Disks in this Uber can be neighbors with each other one time. The matrix can be a symmetric matrix, since with the present use of "neighbor," NW(i, j) can be equal to NW(j, i).

If Ubers are distributed to disks in the RRS evenly, numbers in the matrix can be closer to each other. Therefore, the present techniques can be implemented to find an approach that can make numbers in the matrix almost the same after completing the Ubers allocation.

An example approach to allocate Ubers based on neighborhood matrix is as follows:

1. Select a minimum utilization disk in RRS to allocate a first disk slice;
2. For a next disk slice, select a disk that has a lowest score with previous selected disks;
3. Allocate one free disk slice from the selected disk, and update the neighborhood matrix;
4. Check if Uber allocation has been completed. If not, go to step 2; if yes, end.

FIG. 6 illustrates an example table 600 that shows a result of a (10, 8) code with $\alpha=16$ with resulting invalid partitions generated by run and step, and that can facilitate HashTag codes for reduced repair bandwidth, in accordance with an embodiment of this disclosure. In some examples, part(s) of table 600 can be implemented by part(s) of system architecture 100 of FIG. 1 to facilitate HashTag codes for reduced repair bandwidth.

Table 600 comprises four rows—row 602, row 604, row 606, and row 608—and HashTag codes for reduced repair bandwidth component 610 (which can be similar to HashTag codes for reduced repair bandwidth component 108 of FIG. 1).

A problem can be that generating a valid partition in a HashTag Code that meets Condition 1 by calculating run and step might not be feasible in some examples.

As shown in FIG. 6, generate partition for $J_2$, run=$2^2$, step=4, {11, 16, 5} indicates keeping circulating, and a valid subset cannot be determined that includes 8 numbers. When v=4, there can be a similar problem: {1, 9} keep circulating, and a valid subset for $J_4$ cannot be determined.

A second problem can be that Condition 2 in HashTag Code can be a relatively loose restriction. However, when the stripe width is wide, and the number of sub-strips is small, it can be that Condition 2 will significantly affect the repair bandwidth.

These problems with a HashTag Code can be mitigated be implementing examples of the present techniques. For example, for a (n, k) code, the number of parity nodes can be r (r=n−k), the count of sub-strip can be α, the k systematic nodes can be divided into v (v=k/r) groups: $J_1, J_2, \ldots, J_v$, where each group includes r nodes. The first f (f=$\log_r \alpha$) groups can find the valid partitions that meet Condition 1. Each valid partition can include (1, 2, 3, . . . , α) sub-strips, which are divided into r subsets, and each subset can have a portion (portion=α/r) number of elements.

To solve the first of these discussed problems, the following approach can be used to generate valid partitions that meet Condition 1 for the first f node groups:
1. For each nodes group $J_i$, the initial state can be that partition P is empty, and the element sets S includes (1, 2, 3, . . . , α) sub-strips;
2. The partition has r subsets; select the element for each subset in P from S, and remove the selected elements from S;
3. For each subset, select the first element in S, and add it to the subset, then view the additional elements contained in the parity nodes $P_2, P_3, \ldots, P_r$ of the sub-strip where the first element is located; add these additional elements to the subset;
4. If the number of the subset element is less than the portion, continue to search for additional elements for the parity nodes in the sub-strip where the newly added element is located. If these elements are not in the subset, add these elements into the subset; if these elements are already in the subset, but the number of subset element is still less than the portion, go to step 3 of this technique;
5. If the number of subset elements is equal to the portion, continue to handle the next subset, until all r subsets are processed.

FIG. 7 illustrates an example table 700 that an optimal (10, 8) MSR code with α=16, and that can facilitate HashTag codes for reduced repair bandwidth, in accordance with an embodiment of this disclosure. In some examples, part(s) of table 700 can be implemented by part(s) of system architecture 100 of FIG. 1 to facilitate HashTag codes for reduced repair bandwidth.

Table 700 comprises slices 702, disks 704, and HashTag codes for reduced repair bandwidth component 706 (which can be similar to HashTag codes for reduced repair bandwidth component 108 of FIG. 1).

Figure 8:
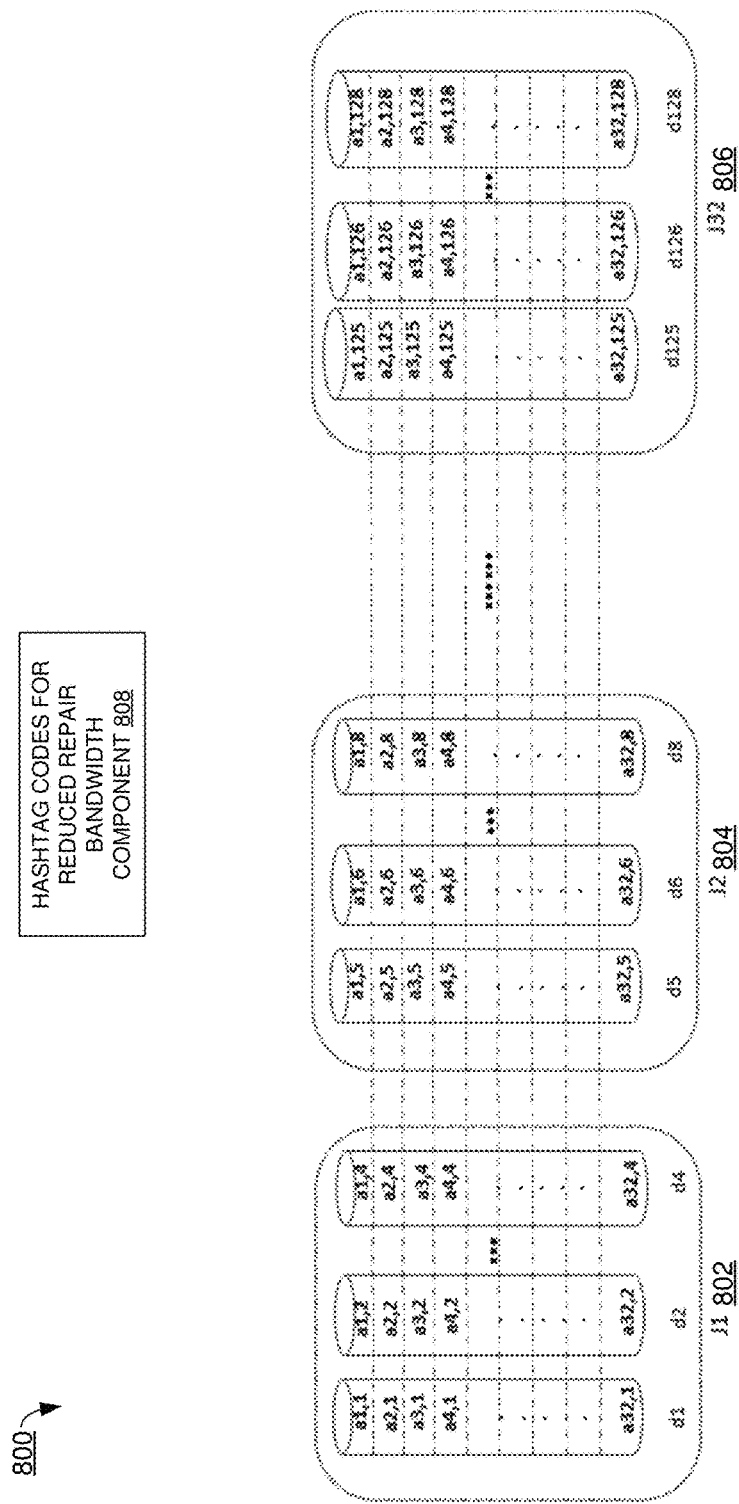
FIG. 8 illustrates an example table (132, 128) HashTag code with $\alpha=32$, and that can facilitate HashTag codes for reduced repair bandwidth, in accordance with an embodiment of this disclosure.

For an example (10, 8) code, and α=16, the valid partitions generated by this technique can be as follows:

$J_1$={{1, 2, 3, 4, 5, 6, 7, 8}, {9, 10, 11, 12, 13, 14, 15, 16}};
$J_2$={{1, 2, 3, 4, 9, 10, 11, 12}, {5, 6, 7, 8, 13, 14, 15, 16}};
$J_3$={{1, 2, 5, 6, 9, 10, 13, 14}, {3, 4, 7, 8, 11, 12, 15, 16}};
$J_4$={{1, 3, 5, 7, 9, 11, 13, 15}, {2, 4, 6, 8, 10, 12, 14, 16}};

Based on the above partitions, the optimal MSR code as shown in table 3 can be obtained:

FIG. 8 illustrates an example 800 (132, 128) HashTag code with α=32, and that can facilitate HashTag codes for reduced repair bandwidth, in accordance with an embodiment of this disclosure. In some examples, part(s) of example 800 can be implemented by part(s) of system architecture 100 of FIG. 1 to facilitate HashTag codes for reduced repair bandwidth.

Example 800 comprises disjoint subset J1 802, disjoint subset J2 804, disjoint subset J32 806, and HashTag codes for reduced repair bandwidth component 808 (which can be similar to HashTag codes for reduced repair bandwidth component 108 of FIG. 1).

According to the present techniques, a NB matrix can be implemented to enhance Condition 2. When the stripe width is relatively wide, and the sub-strip count is relatively small, it can be that finding the valid partitions that meet Condition 1 for all systematic node groups is not possible.

As shown in FIG. 8, for a (132, 128) HashTag Code with α=32, it can be that only valid partitions that meet Condition 1 for $J_1$ and $J_2$ can be found, and the remaining 30 node groups can only meet Condition 2.

Figure 9:
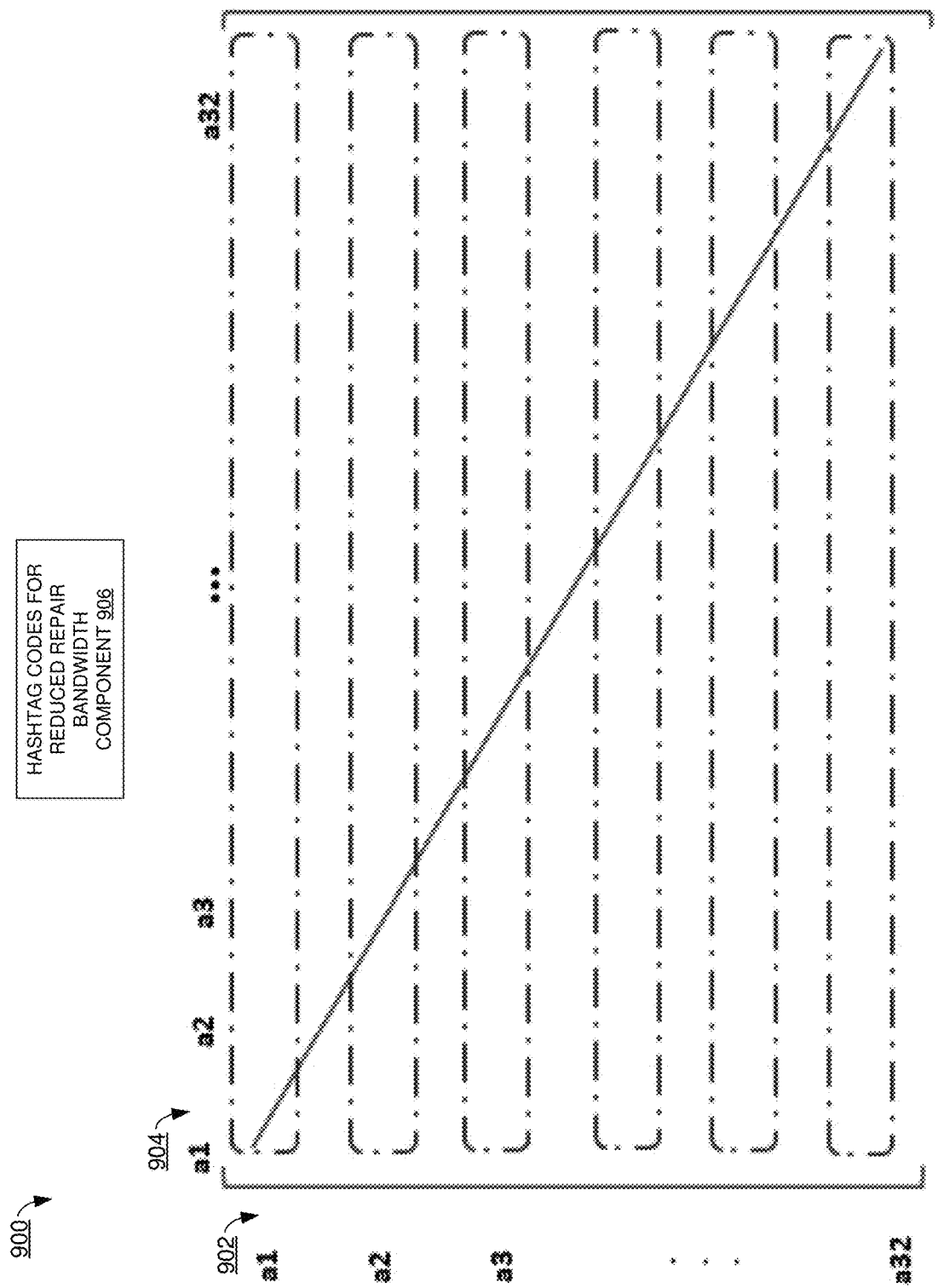
FIG. 9 illustrates an example neighborhood matrix for a (132, 128) HashTag code with $\alpha=32$, and that can facilitate HashTag codes for reduced repair bandwidth, in accordance with an embodiment of this disclosure.

FIG. 9 illustrates an example neighborhood matrix 900 for a (132, 128) HashTag code with α=32, and that can facilitate HashTag codes for reduced repair bandwidth, in accordance with an embodiment of this disclosure. In some examples, part(s) of neighborhood matrix 900 can be implemented by part(s) of system architecture 100 of FIG. 1 to facilitate HashTag codes for reduced repair bandwidth.

Neighborhood matrix 900 comprises rows 902, columns 904, and HashTag codes for reduced repair bandwidth component 906 (which can be similar to HashTag codes for reduced repair bandwidth component 108 of FIG. 1).

It can be that Condition 2 is a relatively loose constraint. In some examples of implementing the present techniques, a NB Matrix can be implemented to reinforce Condition 2.

As shown in FIG. 9, for a neighborhood (NB) Matrix for a (132, 128) HashTag Code with α=32, the dimension of the matrix is 32*32. Each number in the matrix can be identified as NW(i, j), which indicates how many times sub-strip i has ever neighbored with sub-strip j—that is, how many times have sub-strip i and sub-strip j been assigned to the same subset in the partition. The matrix can be a symmetric matrix, where based on the present use of "neighbor," it can be that NW(i, j) is equal to NW(j, i).

A technique to generate subsets in the partition based on neighborhood matrix can be as follows:
1 Select a least occurring sub-strip in the subset, and add it to the subset;
2 For a next sub-strip, select a sub-strip that has a lowest score with previous selected sub-strips, and add it to the subset;
3 Update the neighborhood matrix;
4 Check if the number of subset elements is equal to the portion; if not, go to step 2 of this technique; if yes, then end.

FIG. 10 illustrates an example table 1000 showing a percentage of surviving data strips to read after optimizing HashTag code, and that can facilitate HashTag codes for reduced repair bandwidth, in accordance with an embodiment of this disclosure. In some examples, part(s) of table 1000 can be implemented by part(s) of system architecture 100 of FIG. 1 to facilitate HashTag codes for reduced repair bandwidth Table 1000 comprises rows 1002 and columns 1004.

The following example results can be obtained by implementing the present techniques. After optimizing the HashTag Code, the repair bandwidth for various configurations can be obtained, as shown in the FIG. 10.

It can be that, due to traditional MDS code, when a disk is dropped, all data from the remaining k nodes need to be read to repair it. In such cases, the repair bandwidth can be 100%. From table 4, at the expense of fault tolerance, combining LRC and enhanced HashTag Code technology, according to the present techniques, a system can only need to read from 28.85% of surviving data strips to repair the whole stripe when a sub-strip level=1,024. Without sacrificing fault tolerance, it can be that, according to the present techniques, a system only needs to read from 37.5% of surviving data strips to repair the whole stripe when the sub-strip level=1,024.

Example Process Flows

FIG. 11 illustrates an example process flow 1100 that can facilitate HashTag codes for reduced repair bandwidth, in accordance with an embodiment of this disclosure. In some examples, one or more embodiments of process flow 1100 can be implemented by HashTag codes for reduced repair bandwidth component 108 of FIG. 1, or computing environment 1400 of FIG. 14.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1200 of FIG. 12, and/or process flow 1300 of FIG. 13.

Process flow 1100 begins with 1102, and moves to operation 1104.

Operation 1104 depicts determining to generate error correction codes for a storage system that comprises computing nodes. This can comprise determining to generate HashTag codes for systemic disks (e.g., systemic nodes 106 of FIG. 1) for storage system 102 of FIG. 1.

In some examples, the computing nodes comprise a first group of systemic nodes, and a second group of parity nodes. These can be similar to systemic nodes 106 and parity nodes 110 of FIG. 1.

After operation 1104, process flow 1100 moves to operation 1106.

Operation 1106 depicts logically dividing the computing nodes into disjunctive subsets. This can be similar to the disjunctive subsets (or nodes groups) J as described above.

After operation 1106, process flow 1100 moves to operation 1108.

Operation 1108 depicts, for each disjunctive subset of the disjunctive subsets, creating a partition, with an initial empty state, and identifying a group of elements that comprises sub-strips of the disjunctive subset. That is, a partition P can be empty, and the element sets S can include (1, 2, 3, . . . , α) sub-strips.

In some examples, respective sub-strips of the sub-strips comprise respective contiguous sub-portions of respective storage devices of the computing nodes.

After operation 1108, process flow 1100 moves to operation 1110.

Operation 1110 depicts adding a first element from each disjunctive subset of the disjunctive subsets to the partition, and removing the first element from the group of elements. That is, this can comprise a scenario where the partition has r subsets; select the element for each subset in P from S, and remove the selected elements from S.

After operation 1110, process flow 1100 moves to operation 1112.

Operation 1112 depicts, for each disjunctive subset, adding a second element from the group of elements to the disjunctive subset along with elements stored in parity notes of a sub-strip where the second element is located. That is, this can comprise a scenario where, for each subset, select the first element in S, and add it to the subset, then view the additional elements contained in the parity nodes $P_2$, $P_3$, . . . , $P_r$ of the sub-strip where the first element is located; add these additional elements to the subset.

After operation 1112, process flow 1100 moves to operation 1114.

Operation 1114 depicts in response to determining that a number of elements of the disjunctive subset is at least as large as a number of the computing nodes, creating the error correction codes based on the elements. That is, this can comprise a scenario where, if the number of subset element is equal to portion, continue to handle the next subset, until all r subsets are processed.

In some examples, operation 1114 comprises, before the determining that the number of elements of the disjunctive subset is at least as large as the number of the computing nodes, and in response to determining that the number of elements of the disjunctive subset less than the number of the computing nodes, adding additional elements for parity nodes in the sub-strip where the second element is located. That is, where the number of subset element is less than portion, then continue to search for the additional elements for the parity nodes in the sub-strip where the newly added element is located. If these elements are not in the subset, add these elements into the subset.

In some examples, operation 1114 comprises, in response to the determining that the number of elements of the disjunctive subset less than the number of the computing nodes after adding the additional elements, performing an iteration of adding at least one element from each disjunctive subset to the partition, and removing the at least one element from the group of elements. That is, if these elements are already in the subset, but the number of subset element is still less than the portion, then operation 1110 (and operations 1112 and 1114) can be repeated.

In some examples, operation 1114 comprises, before creating the error correction codes, determining that at least one disjunctive subset of the disjunctive subsets comprises a portion of elements that corresponds to a first ratio of a number of the sub-strips and a number of parity nodes of the computing nodes, wherein the portion of elements comprises runs having at least a length that corresponds to a second ratio of the number of the sub-strips and a product of a number of the disjunctive subsets and the number of parity nodes, and wherein a distance between indices of the portion of elements comprises a step that corresponds to a third ratio of the number of the sub-strips and the number of parity nodes minus a value of the length of the runs. That is, the error correction codes can be generated to satisfy Condition 1 as discussed above, where at least one subset $D_{p,dj}$ has portion=α/r elements with runs of run consecutive elements separated with a distance between the indexes equal to step.

In some examples, operation 1114 comprises, before creating the error correction codes, determining that an amount of bandwidth associated with performing data recovery on the storage system using the disjunctive subsets satisfies a performance criterion. That is, it can be determined that Condition 2, as described herein, is satisfied.

In some examples, operation 1114 comprises, for the partition, maintaining a neighborhood matrix that identifies the sub-strips, and while the number of elements in a disjunctive subset of the disjunctive subsets is less than a portion of elements that corresponds to a ratio of a number of the sub-strips and a number of parity nodes of the computing nodes, performing iterations of, adding a least occurring sub-strip to the partition, and updating the neighborhood matrix based on adding the least occurring sub-strip to the partition. That is, a technique to generate subsets in the partition based on a neighborhood matrix as described herein can be implemented.

In some examples, the neighborhood matrix identifies how many times respective sub-strips of the sub-strips have neighbored with other respective sub-strips of the sub-strips. That is, each number in a matrix can be denoted as NW(i, j), which stands for how many times sub-strip i has ever neighbored with sub-strip j—put another way, how many times have sub-strip i and sub-strip j been assigned to the same subset in the partition.

After operation 1114, process flow 1100 moves to operation 1116.

Operation 1116 depicts storing the error correction codes on parity nodes of the computing nodes. Using the example of FIG. 1, this can comprise storing the HashTag codes in parity nodes 110.

In some examples, operation 1116 comprises determining that there is lost data that was stored on the computing nodes, and recovering the lost data to the computing nodes based on the error correction codes. That is, HashTag codes (e.g., those stored on parity nodes 110 of FIG. 1) can be used to recover data on a storage system (e.g., data stored on systemic nodes 106 of storage system 102).

After operation 1116, process flow 1100 moves to 1118, where process flow 1118 ends.

FIG. 12 illustrates an example process flow 1200 that can facilitate HashTag codes for reduced repair bandwidth, in accordance with an embodiment of this disclosure. In some examples, one or more embodiments of process flow 1200 can be implemented by HashTag codes for reduced repair bandwidth component 108 of FIG. 1, or computing environment 1400 of FIG. 141.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1100 of FIG. 11, and/or process flow 1300 of FIG. 13.

Process flow 1200 begins with 1202, and moves to operation 1204.

Operation 1204 depicts logically dividing computing nodes of a storage system into disjunctive subsets. In some examples, operation 1204 can be implemented in a similar manner as operation 1106 of FIG. 11.

After operation 1204, process flow 1200 moves to operation 1206.

Operation 1206 depicts, for each disjunctive subset of the disjunctive subsets, creating a partition that is initially empty, and identifying a group of elements that comprises sub-strips of the disjunctive subset. In some examples, operation 1206 can be implemented in a similar manner as operation 1108 of FIG. 11.

After operation 1206, process flow 1200 moves to operation 1208.

Operation 1208 depicts adding a first element from each disjunctive subset of the disjunctive subsets to the partition, and removing the first element from the group of elements. In some examples, operation 1208 can be implemented in a similar manner as operation 1110 of FIG. 11.

After operation 1208, process flow 1200 moves to operation 1210.

Operation 1210 depicts, for each disjunctive subset, adding a second element from the group of elements to the disjunctive subset along with elements stored in parity notes of a sub-strip where the second element is located. In some examples, operation 1210 can be implemented in a similar manner as operation 1112 of FIG. 11.

After operation 1210, process flow 1200 moves to operation 1212.

Operation 1212 depicts, in response to determining that a number of elements of the disjunctive subset is at least as large as a number of the computing nodes, creating error correction codes based on the elements. In some examples, operation 1212 can be implemented in a similar manner as operation 1114 of FIG. 11.

In some examples, operation 1212 comprises, before the determining that the number of elements of the disjunctive subset is at least as large as the number of the computing nodes, and in response to determining that the number of elements of the disjunctive subset less than the number of the computing nodes, adding additional elements for parity nodes in the sub-strip where the second element is located.

In some examples, operation 1212 comprises, in response to the determining that the number of elements of the disjunctive subset less than the number of the computing nodes after adding the additional elements, performing an iteration of adding at least one element from each disjunctive subset to the partition, and removing the at least one element from the group of elements.

In some examples, operation 1212 comprises before creating the error correction codes, determining that at least one disjunctive subset of the disjunctive subsets comprises a portion of elements that corresponds to a ratio of a number of the sub-strips and a number of parity nodes of the computing nodes, wherein the portion of elements comprises runs having at least a length that corresponds to a ratio of the number of the sub-strips and a product of a number of the disjunctive subsets and the number of parity nodes, and wherein a distance between indices of the portion of elements comprises a step that corresponds to a ratio of the number of the sub-strips and the number of parity nodes minus a value of the length of the runs.

In some examples, operation 1212 comprises, before creating the error correction codes, determining that an amount of bandwidth associated with performing data recovery on the storage system using the disjunctive subsets satisfies a performance criterion.

After operation 1212, process flow 1200 moves to operation 1214.

Operation 1214 depicts storing the error correction codes on the computing nodes. In some examples, operation 1214 can be implemented in a similar manner as operation 1116 of FIG. 11.

After operation 1214, process flow 1200 moves to 1216, where process flow 1200 ends.

FIG. 13 illustrates an example process flow 1300 that can facilitate HashTag codes for reduced repair bandwidth, in accordance with an embodiment of this disclosure. In some examples, one or more embodiments of process flow 1300 can be implemented by HashTag codes for reduced repair bandwidth component 108 of FIG. 1, or computing environment 1400 of FIG. 141.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 1100 of FIG. 11, and/or process flow 1200 of FIG. 12.

Process flow 1300 begins with 1302, and moves to operation 1304.

Operation 1304 depicts, for each disjunctive subset of disjunctive subsets of computer nodes of a storage system, identifying a group of elements that comprises sub-strips of the disjunctive subsets. In some examples, operation 1304 can be implemented in a similar manner as operation 1108 of FIG. 11.

After operation 1304, process flow 1300 moves to operation 1306.

Operation 1306 depicts adding a first element from each disjunctive subset to a partition, and removing the first element from the group of elements. In some examples, operation 1306 can be implemented in a similar manner as operation 1110 of FIG. 11. After operation 1306, process flow 1300 moves to operation 1308.

Operation 1308 depicts, for each disjunctive subset of the disjunctive subsets, adding a second element from the group of elements to the disjunctive subset along with elements stored in parity notes of a sub-strip where the second element is located. In some examples, operation 1308 can be implemented in a similar manner as operation 1112 of FIG. 11.

After operation 1308, process flow 1300 moves to operation 1310.

Operation 1310 depicts, in response to determining that a number of elements of the disjunctive subset is at least as large as a number of the computer nodes, creating error correction codes based on the elements. In some examples, operation 1310 can be implemented in a similar manner as operation 1114 of FIG. 11.

In some examples, operation 1310 comprises, for the partition, maintaining a neighborhood matrix that identifies the sub-strips, and while the number of elements in a disjunctive subset of the disjunctive subsets is less than a portion of elements that corresponds to a ratio of the number of the sub-strips and a number of parity nodes of the computer nodes, performing iterations of, adding a least occurring sub-strip to the partition, and updating the neighborhood matrix based on adding the least occurring sub-strip to the partition.

In some examples, neighborhood matrix identifies how many times respective sub-strips of the sub-strips have neighbored with other respective sub-strips of the sub-strips.

In some examples, the neighborhood matrix identifies how many times respective sub-strips of the sub-strips have been assigned to a same disjunctive subset of the disjunctive subsets in the partition.

In some examples, operation 1310 comprises, before the determining that the number of elements of the disjunctive subset is at least as large as the number of the computer nodes, and in response to determining that the number of elements of the disjunctive subset less than the number of the computer nodes, adding additional elements for parity nodes in the sub-strip where the second element is located.

After operation 1310, process flow 1300 moves to operation 1312.

Operation 1312 depicts storing the error correction codes on the computer nodes. In some examples, operation 1312 can be implemented in a similar manner as operation 1116 of FIG. 11.

After operation 1312, process flow 1300 moves to 1314, where process flow 1300 ends.

Example Operating Environment

In order to provide additional context for various embodiments described herein, FIG. 14 and the following discussion are intended to provide a brief, general description of a suitable computing environment 1400 in which the various embodiments of the embodiment described herein can be implemented.

For example, parts of computing environment 1400 can be used to implement one or more embodiments of storage system 102, storage nodes 104, and/or HashTag codes for reduced repair bandwidth component 108.

In some examples, computing environment 1400 can implement one or more embodiments of the process flows of FIGS. 11-13 to facilitate HashTag codes for reduced repair bandwidth.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a nonvolatile storage such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR)

remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples, and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory that stores executable instructions that, when executed by the at least one processor, facilitate performance of operations, comprising:
      determining to generate error correction codes for a storage system that comprises computing nodes;
      logically dividing the computing nodes into disjunctive subsets;
      for each disjunctive subset of the disjunctive subsets, creating a partition, with an initial empty state, and identifying a group of elements that comprises substrips of the disjunctive subset;
      adding a first element from each disjunctive subset of the disjunctive subsets to the partition, and removing the first element from the group of elements;
      for each disjunctive subset, adding a second element from the group of elements to the disjunctive subset along with elements stored in parity notes of a sub-strip where the second element is located;
      in response to determining that a number of elements of the disjunctive subset is at least as large as a number of the computing nodes, creating the error correction codes based on the elements; and
      storing the error correction codes on parity nodes of the computing nodes.

2. The system of claim 1, wherein the operations further comprise:
   determining that there is lost data that was stored on the computing nodes; and
   recovering the lost data to the computing nodes based on the error correction codes.

3. The system of claim 1, wherein the operations further comprise:
   before the determining that the number of elements of the disjunctive subset is at least as large as the number of the computing nodes,
   and in response to determining that the number of elements of the disjunctive subset less than the number of the computing nodes,
   adding additional elements for parity nodes in the sub-strip where the second element is located.

4. The system of claim 3, wherein the operations further comprise:
in response to the determining that the number of elements of the disjunctive subset less than the number of the computing nodes after adding the additional elements, performing an iteration of adding at least one element from each disjunctive subset to the partition, and removing the at least one element from the group of elements.

5. The system of claim 1, wherein respective sub-strips of the sub-strips comprise respective contiguous sub-portions of respective storage devices of the computing nodes.

6. The system of claim 1, wherein the computing nodes comprise a first group of systemic nodes, and a second group of parity nodes.

7. The system of claim 1, wherein the operations further comprise:
before creating the error correction codes, determining that at least one disjunctive subset of the disjunctive subsets comprises a portion of elements that corresponds to a first ratio of a number of the sub-strips and a number of parity nodes of the computing nodes,
wherein the portion of elements comprises runs having at least a length that corresponds to a second ratio of the number of the sub-strips and a product of a number of the disjunctive subsets and the number of parity nodes, and
wherein a distance between indices of the portion of elements comprises a step that corresponds to a third ratio of the number of the sub-strips and the number of parity nodes minus a value of the length of the runs.

8. The system of claim 1, wherein the operations further comprise:
before creating the error correction codes, determining that an amount of bandwidth associated with performing data recovery on the storage system using the disjunctive subsets satisfies a performance criterion.

9. The system of claim 1, wherein the operations further comprise:
for the partition, maintaining a neighborhood matrix that identifies the sub-strips; and
while the number of elements in a disjunctive subset of the disjunctive subsets is less than a portion of elements that corresponds to a ratio of a number of the sub-strips and a number of parity nodes of the computing nodes, performing iterations of,
adding a least occurring sub-strip to the partition, and updating the neighborhood matrix based on adding the least occurring sub-strip to the partition.

10. The system of claim 9, wherein the neighborhood matrix identifies how many times respective sub-strips of the sub-strips have neighbored with other respective sub-strips of the sub-strips.

11. A method, comprising:
logically dividing, by a system comprising at least one processor, computing nodes of a storage system into disjunctive subsets;
for each disjunctive subset of the disjunctive subsets,
creating, by the system, a partition that is initially empty, and
identifying, by the system, a group of elements that comprises sub-strips of the disjunctive subset;
adding, by the system, a first element from each disjunctive subset of the disjunctive subsets to the partition, and removing the first element from the group of elements;
for each disjunctive subset, adding, by the system, a second element from the group of elements to the disjunctive subset along with elements stored in parity notes of a sub-strip where the second element is located;
in response to determining that a number of elements of the disjunctive subset is at least as large as a number of the computing nodes, creating, by the system, error correction codes based on the elements; and
storing, by the system, the error correction codes on the computing nodes.

12. The method of claim 11, further comprising:
before the determining that the number of elements of the disjunctive subset is at least as large as the number of the computing nodes, and in response to determining that the number of elements of the disjunctive subset less than the number of the computing nodes, adding, by the system, additional elements for parity nodes in the sub-strip where the second element is located.

13. The method of claim 12, further comprising:
in response to the determining that the number of elements of the disjunctive subset less than the number of the computing nodes after adding the additional elements, performing, by the system, an iteration of adding at least one element from each disjunctive subset to the partition, and removing the at least one element from the group of elements.

14. The method of claim 11, further comprising:
before creating the error correction codes, determining, by the system, that at least one disjunctive subset of the disjunctive subsets comprises a portion of elements that corresponds to a ratio of a number of the sub-strips and a number of parity nodes of the computing nodes,
wherein the portion of elements comprises runs having at least a length that corresponds to a ratio of the number of the sub-strips and a product of a number of the disjunctive subsets and the number of parity nodes, and
wherein a distance between indices of the portion of elements comprises a step that corresponds to a ratio of the number of the sub-strips and the number of parity nodes minus a value of the length of the runs.

15. The method of claim 11, further comprising:
before creating the error correction codes, determining, by the system, that an amount of bandwidth associated with performing data recovery on the storage system using the disjunctive subsets satisfies a performance criterion.

16. A non-transitory computer-readable medium comprising instructions that, in response to execution, cause a system comprising a processor to perform operations, comprising:
for each disjunctive subset of disjunctive subsets of computer nodes of a storage system, identifying a group of elements that comprises sub-strips of the disjunctive subsets;
adding a first element from each disjunctive subset to a partition, and removing the first element from the group of elements;
for each disjunctive subset of the disjunctive subsets, adding a second element from the group of elements to the disjunctive subset along with elements stored in parity notes of a sub-strip where the second element is located;
in response to determining that a number of elements of the disjunctive subset is at least as large as a number of the computer nodes, creating error correction codes based on the elements; and
storing the error correction codes on the computer nodes.

17. The non-transitory computer-readable medium of claim 16, wherein the operations further comprise:
for the partition, maintaining a neighborhood matrix that identifies the sub-strips; and
while the number of elements in a disjunctive subset of the disjunctive subsets is less than a portion of elements that corresponds to a ratio of the number of the sub-strips and a number of parity nodes of the computer nodes, performing iterations of,
adding a least occurring sub-strip to the partition, and
updating the neighborhood matrix based on adding the least occurring sub-strip to the partition.

18. The non-transitory computer-readable medium of claim 17, wherein the neighborhood matrix identifies how many times respective sub-strips of the sub-strips have neighbored with other respective sub-strips of the sub-strips.

19. The non-transitory computer-readable medium of claim 17, wherein the neighborhood matrix identifies how many times respective sub-strips of the sub-strips have been assigned to a same disjunctive subset of the disjunctive subsets in the partition.

20. The non-transitory computer-readable medium of claim 16, wherein the operations further comprise:
before the determining that the number of elements of the disjunctive subset is at least as large as the number of the computer nodes, and in response to determining that the number of elements of the disjunctive subset less than the number of the computer nodes, adding, by the system, additional elements for parity nodes in the sub-strip where the second element is located.

\* \* \* \* \*